UNITED STATES PATENT OFFICE.

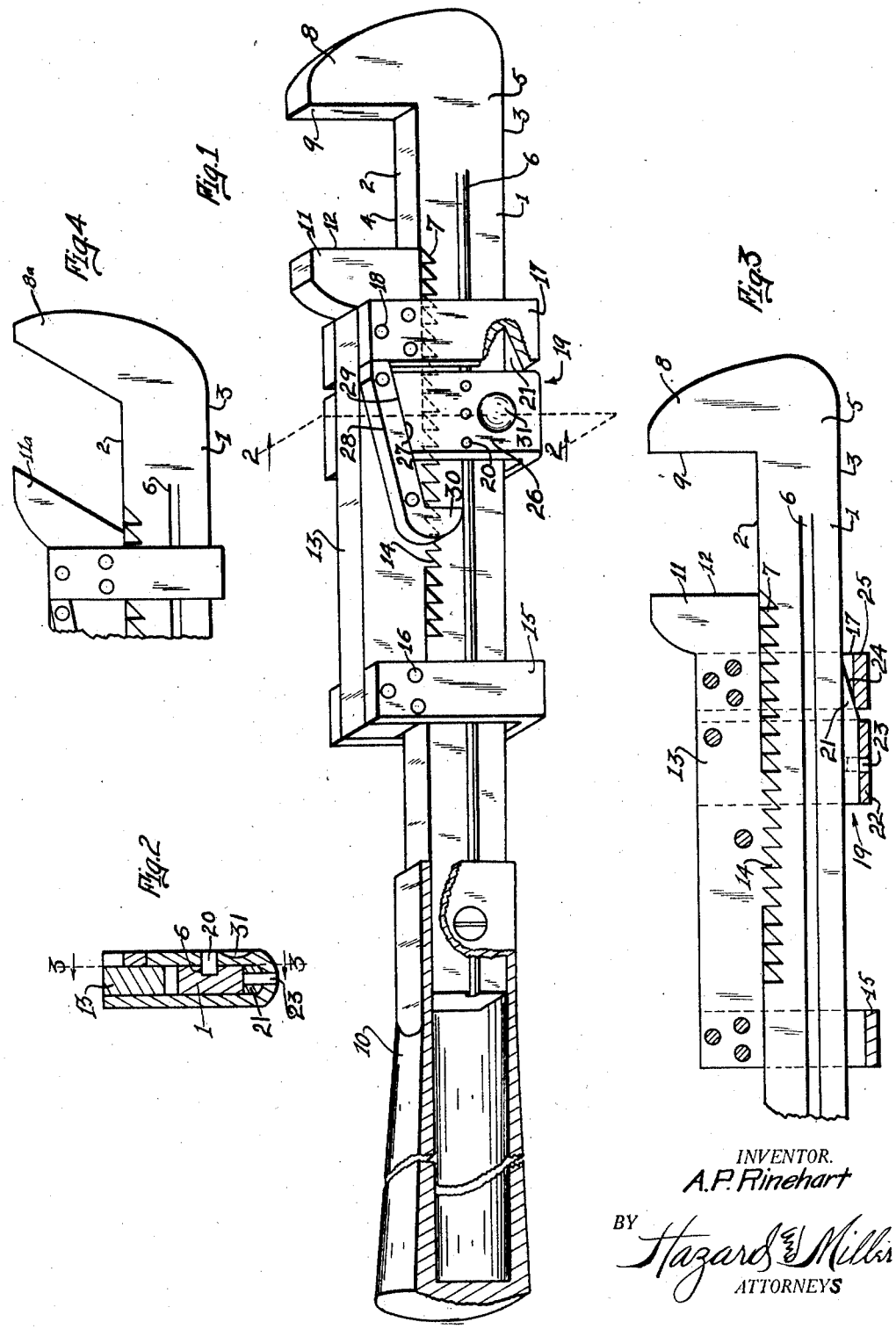

ARMSTRONG P. RINEHART, OF LOS ANGELES, CALIFORNIA.

WRENCH.

1,334,636.  Specification of Letters Patent.  Patented Mar. 23, 1920.

Application filed September 9, 1919. Serial No. 322,706.

*To all whom it may concern:*

Be it known that I, ARMSTRONG PORTER RINEHART, a citizen of the United States, residing at Los Angeles, in the county of Los Angeles and State of California, have invented new and useful Improvements in Wrenches, of which the following is a specification.

My object is to make a quick acting wrench, and my invention consists of the novel features herein shown, described and claimed.

Figure 1 is a perspective of a quick acting wrench embodying the principles of my invention, parts being broken away and shown in section.

Fig. 2 is a cross section on the line 2—2 of Fig. 1 and looking in the direction indicated by the arrows.

Fig. 3 is a fragmentary longitudinal section on the line 3—3 of Fig. 2 and looking in the direction indicated by the arrows.

Fig. 4 is a fragmentary side elevation showing inclined jaws instead of square jaws.

The main bar 1 is rectangular in cross section and straight and has an inner face 2, an outer face 3 and side faces 4 and 5. A groove 6 is formed in the side face 5 and extends throughout the length of the bar 1. Teeth 7 are formed upon the face 2.

The rigid jaw 8 extends from one end of the bar 1 and has an inner face 9 at right angles to the face 2. The handle 10 is fixed upon the other end of the bar 1. The movable jaw 11 has a face 12 in opposition to the face 9 of the jaw 8 and the movable jaw 11 is formed integral with the movable bar 13. The movable bar 13 has teeth 14 adapted to mesh and interlock with the teeth 7 and hold the jaw 12 from moving away from the jaw 8.

A U-clip 15 fits around the bar 1 and straddles the end of the bar 13 and is secured to the bar 13 by rivets 16. A similar U-clip 17 fits the bar 1 and is secured to the bar 13 by rivets 18. The clips 15 and 17 are elongated transversely so that the bar 13 may move to and from the bar 1, and so that when the bar 13 moves away from the bar 1 the teeth 14 are out of mesh with the teeth 7 and the jaw 12 may be moved freely to and from the jaw 8.

The locking cam 19 is U-shaped and fits against the faces 4 and 5 of the bar 1. Dowel pins 20 are fixed through one side of the cam 19 and the inner ends of the dowel pins slide in the groove 6. A wedge 21 fits against the face 3 of the bar 1 inside of the central portion 22 of the cam 19 and is held in place by a pin 23. The wedge 21 has a beveled outer face 24 extending beyond the central portion 22 and adapted to pass between the face 3 of the bar 1 and the central portion 25 of the clip 17 so as to draw the bar 13 toward the bar 1 and force the teeth 14 into mesh with the teeth 7 and lock the jaw 11 in its adjusted position relative to the jaw 8.

The side bar 26 of the cam 19 has a beveled face 27 inclined in a direction longitudinally of the bar 1. A slipper bearing member 28 is secured to the side of the bar 13 and has an inclined cam face 29 against which the face 27 bears. A stop 30 is formed upon the rear end of the cam 28 to limit the backward movement of the cam 19.

A depression 31 in the outer face of the side bar 26 forms a thumb hole for gripping the cam 19. When the cam 19 is manually grasped and pulled toward the handle 10 the wedge 21 moves out from under the central portion 24 and the face 27 bearing upon the face 29 moves the bar 13 to move the teeth 14 out of mesh with the teeth 7 and then the jaw 11 may be freely moved against the nut to be operated.

When the jaw 11 has been adjusted to the proper position movement of the cam 19 forwardly will move the face 27 upon the face 29 and allow the bar 13 to move toward the bar 1 and the wedge 21 will move under the central portion 25 of the clip 17 and draw the teeth 14 into mesh with the teeth 7 and hold the jaw 11 rigidly against the nut.

Thus I have produced a quick acting wrench comprising a straight rectangular main bar having locking teeth upon its inner side and a groove in one side at right angles to the teeth and a rigid jaw extending in the same direction as the teeth; a sliding jaw formed integral with the sliding bar and having clips connecting the sliding bar to the main bar and locking teeth extending toward the main bar; so that the teeth of the sliding bar may move into and out of mesh with the teeth of the main bar; and a cam construction adapted to move the sliding bar to and from the main bar and lock the teeth together to hold the sliding jaw rigidly in an adjusted position.

In Figs. 1 and 3 the rigid jaw 8 and the sliding jaw 11 are at right angles to the main bar 1. In Fig. 4 the rigid jaw 8ª and the sliding jaw 11ª are inclined relative to the bar 1. It is obvious that the inclination from the right angle may be varied to any desired extent.

Various changes may be made without departing from the spirit of my invention as claimed.

I claim:

1. A quick acting wrench comprising a main bar having a rigid jaw extending from one end and having teeth extending in the same direction as the jaw and a longitudinal groove in the side thereof; a sliding member comprising a short bar having an integral jaw adapted to oppose the jaw on the main bar and having teeth adapted to lock with the teeth of the main bar; yokes fixed to the short bar and surrounding the main bar, a slipper bearing extending from the side of the short bar and disposed slantingly toward the main bar, a clip slidably mounted upon the main bar and having a tongue slidably adapted to the groove thereof and having a top surface adapted to engage the slipper bearing, and a wedge fixed to the clip and adapted to operate between one of the yokes and the main bar whereby the teeth of the main bar will be held in engagement with the teeth of the short bar.

2. A quick acting wrench comprising a bar having a rigid jaw extending from one end, a short bar slidably mounted on the main bar and having a rigid jaw opposing the jaw of the main bar, yokes for slidably yoking said short bar to said main bar, a clip slidably mounted on the main bar; a slipper bearing extending from the side of the short bar and disposed slantingly toward the main bar and adapted to engage the clip; a wedge extending from the clip and disposed to slip between the main bar and a yoke of the short bar whereby the short bar may be held closely in contact with the main bar; and means for holding the short bar from sliding backward when the two bars are held by the wedge on the clip.

3. A quick acting wrench comprising a main bar having a rigid jaw extending from one end, a short bar slidably yoked to the main bar and having a rigid jaw positioned to oppose the jaw of the main bar, a slipper bearing extending from the side of the short bar, and disposed slantingly toward the main bar; a clip slidably mounted on the main bar and adapted to separate the two bars slightly by engaging the slanting slipper bearing; means for holding the two bars in engagement with each other; and means disposed in the engaging surface of the two bars for preventing the short bar from sliding upon the main bar when the bars are held in engagement by the means first above mentioned.

In testimony whereof I have signed my name to this specification.

A. P. RINEHART.